No. 616,285. Patented Dec. 20, 1898.
F. BERGER.
SLED PROPELLER.
(Application filed May 31, 1898.)

(No Model.)

Witnesses
Inventor.
Franz Berger
By Erwin Wheeler & Wheeler
Attorneys

UNITED STATES PATENT OFFICE.

FRANZ BERGER, OF MILWAUKEE, WISCONSIN, ASSIGNOR OF ONE-HALF TO GUSTAF HONEGGER, OF SAME PLACE.

SLED-PROPELLER.

SPECIFICATION forming part of Letters Patent No. 616,285, dated December 20, 1898.

Application filed May 31, 1898. Serial No. 682,155. (No model.)

*To all whom it may concern:*

Be it known that I, FRANZ BERGER, a citizen of the United States, residing at Milwaukee, in the county of Milwaukee and State of Wisconsin, have invented new and useful Improvements in Sled-Propellers, of which the following is a specification.

My invention relates to improvements in sled-propellers.

The object of my invention is to provide means for applying a frame and driving-gear similar to that used for bicycles in the propulsion of sleds.

In the following description reference is had to the accompanying drawings, in which—

Figure 1:
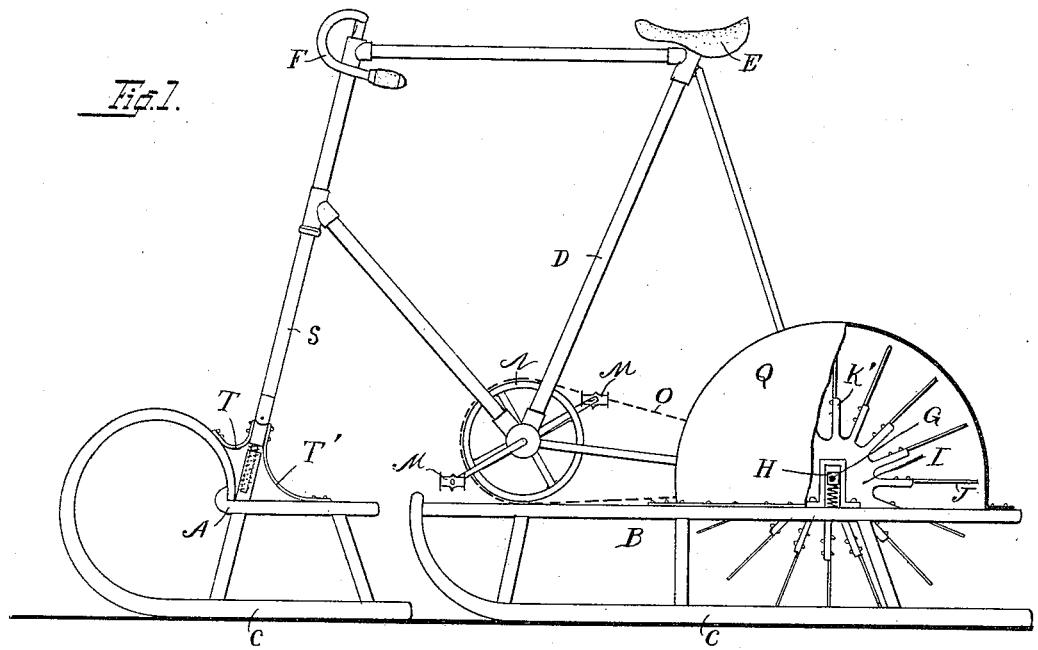
Figure 2:
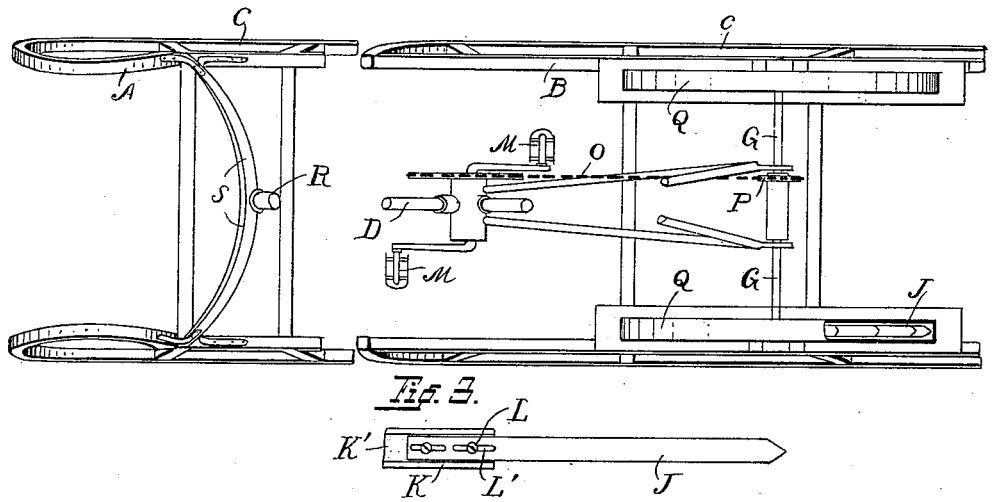
Figure 3:
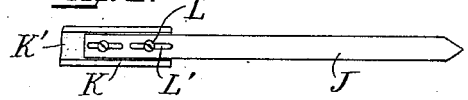

Figure 1 is a side view of my invention. Fig. 2 is a top view of the same. Fig. 3 is a detail view showing the means for adjusting the arms of the rotary driving device.

Like parts are identified by the same reference-letters throughout the several views.

My sled is formed with front and rear bobs A and B, respectively, the runners C of each being preferably separated, so as to fit the tracks of ordinary vehicles.

D is a frame, preferably constructed similarly to the ordinary bicycle-frame and provided with a saddle E and handle-bars F. The frame is secured to the rear bob B by means of a shaft G, which is engaged in spring-supported journal bearings or boxes H, as best shown in Fig. 1.

Located on the shaft G intermediate of the runners I have provided rotary drivers I, having radial arms, the outer sections J of which are elastic and engaged between clamping-lips K of rigidly-disposed inner sections K'. The sections are held together longitudinally by means of bolts L, which are inserted through slots L' in the sections J, thus permitting the latter to be longitudinally adjusted, as best shown in Fig. 3.

Motion is communicated to the drivers from the pedals M through the drive sprocket-wheel N, chain O, sprocket-wheel P, and shaft G, and the sections J are so adjusted as to engage the surface upon which the runners travel with sufficient force to propel the vehicle. The upper portion of the driver is covered by housings Q. The head-rod R of the frame is provided with a yoke S, the respective members of which are secured to the front bob by means of curved elastic bars T and T', located in a plane at right angles to that of the yoke. With this construction I provide a yielding support, which allows the front bob to be turned or to enter a hollow at one side of the track without materially disturbing the equilibrium of the rider.

I attach great importance to the use of the yoke S and elastic bars T and T' for the reason above stated, as I believe the device is thereby brought more completely under the control of the rider than with any other possible construction. I also consider as important to the success of my device the use of the adjustable arm-sections J, whereby the arms may be readjusted as they become worn or replaced when broken. It will also be observed that the elastic bearings in which the shaft G is supported permit the drivers to pass over obstacles without raising the runners.

Having thus described my invention, what I claim as new, and desire to secure by Letters Patent, is—

1. The combination of a supporting-frame mounted upon a pair or set of bob-sleds, a shaft mounted in elastic bearings on the rear sled, drivers mounted on said shaft and provided with adjustable arms, and pedal and crank connections for communicating motion to said drivers, substantially as described.

2. The combination of a set or pair of bob-sleds, a supporting-frame provided with a seat and steering apparatus, and having a yoke attached to the front sled by elastic bars projecting in a transverse plane to that of the yoke, a shaft mounted in the rear portion of the frame, and secured in elastic bearings on the rear sled, one or more drivers mounted on said shaft, and pedal and crank mechanism for communicating motion thereto, substantially as described.

3. The combination of a set or pair of bob-sleds, a supporting-frame provided with a seat and steering apparatus, and having a yoke attached to the front sled by elastic bars projecting in a transverse plane to that of the yoke, a shaft mounted in the rear portion of the frame and secured in elastic bearings on the rear sled, one or more drivers mounted on said shaft, and provided with adjustable flexible arms adapted to engage the surface traveled upon, and pedal and crank mechanism for communicating motion thereto, substantially as described.

4. The combination of a supporting-frame mounted upon a pair or set of bob-sleds, a shaft mounted in elastic bearings on the rear sled, drivers mounted on said shaft and provided with adjustable flexible arms, housings covering the upper portions of said drivers, and pedal and crank connections for communicating motion to said drivers, substantially as described.

5. In a sled-propeller, a driver comprising a body portion having rigid radial arm-sections, flexible arm-sections slotted at their inner ends and engaged between clamping-lips on the rigid arm-sections, and bolts passing through the rigid arm-sections and engaged in said slots, substantially as described.

In witness whereof I have hereunto set my hand this 21st day of May, 1898.

FRANZ BERGER.

Witnesses:
  JAS. B. ERWIN,
  LEVERETT C. WHEELER.